United States Patent
Barker (10) Patent No.: US 9,241,444 B2
(45) Date of Patent: Jan. 26, 2016

(54) DRIVE TRAIN FOR A HEDGE TRIMMER, A HEDGE TRIMMER AND A METHOD OF CONTROLLING A HEDGE TRIMMER

(75) Inventor: David Barker, Goole (GB)

(73) Assignee: BLACK & DECKER INC., New Britain, CT (US)

( * ) Notice: Subject to any disclaimer, the term of this patent is extended or adjusted under 35 U.S.C. 154(b) by 271 days.

(21) Appl. No.: 13/567,313

(22) Filed: Aug. 6, 2012

(65) Prior Publication Data
US 2013/0192432 A1  Aug. 1, 2013

(30) Foreign Application Priority Data
Aug. 16, 2011 (EP) ..................... 11177674

(51) Int. Cl.
| | | |
|---|---|---|
| A01G 3/053 | (2006.01) | |
| B26B 19/36 | (2006.01) | |
| F16H 1/06 | (2006.01) | |
| B26B 19/06 | (2006.01) | |
| B26B 19/00 | (2006.01) | |

(52) U.S. Cl.
CPC ............... *A01G 3/053* (2013.01); *B26B 19/36* (2013.01); *F16H 1/06* (2013.01); *B26B 19/00* (2013.01); *B26B 19/06* (2013.01); *B26B 19/066* (2013.01); *Y10T 74/19651* (2015.01); *Y10T 83/04* (2015.04)

(58) Field of Classification Search
CPC .......... F16D 11/04; B23D 47/12; F16H 1/06; Y10T 74/19651; B26B 19/06; B26B 19/066; B26B 19/36; B26B 19/00; A01G 3/053
USPC ............... 30/277.4, 208–210, 215–220, 374; 123/185.3; 192/69.7
See application file for complete search history.

(56) References Cited

U.S. PATENT DOCUMENTS

| | | | | |
|---|---|---|---|---|
| 2,692,668 | A | * | 10/1954 | Rupp .............................. 192/148 |
| 4,286,675 | A | * | 9/1981 | Tuggle ........................... 173/213 |
| 5,511,715 | A | * | 4/1996 | Crutcher et al. ............... 227/131 |
| 2007/0287571 | A1 | * | 12/2007 | Li ................................... 475/248 |
| 2011/0017168 | A1 | * | 1/2011 | Gilpatrick ................... 123/197.5 |
| 2011/0154670 | A1 | * | 6/2011 | Tokunaga et al. ................ 30/374 |
| 2011/0154796 | A1 | * | 6/2011 | Onose ............................. 56/233 |
| 2012/0036722 | A1 | * | 2/2012 | Hittmann et al. ................ 30/216 |

FOREIGN PATENT DOCUMENTS

| | | |
|---|---|---|
| EP | 2286659 | 2/2011 |
| GB | 848325 | 9/1960 |
| GB | 884387 | * 12/1961 |
| GB | 1406244 | 9/1975 |
| GB | 1427077 | 3/1976 |

* cited by examiner

*Primary Examiner* — Ned Landrum
*Assistant Examiner* — Nhat Chieu Do
(74) *Attorney, Agent, or Firm* — John Yun (57) ABSTRACT

The invention provides a drive train for a hedge trimmer, the drive train being arranged, in use, to provide power to a downstream mechanism, the drive train comprising: a motor having an output shaft; a pinion coupled to the output shaft; a reduction gear arranged to be driven by the pinion, the reduction gear contained within a gear housing; a flywheel engageable to the output shaft, wherein the flywheel is arranged within the gear housing.

13 Claims, 8 Drawing Sheets

DRIVE TRAIN FOR A HEDGE TRIMMER, A HEDGE TRIMMER AND A METHOD OF CONTROLLING A HEDGE TRIMMER

The present invention relates to a drive train for a hedge trimmer, a hedge trimmer and to a method of controlling a hedge trimmer.

BACKGROUND OF THE INVENTION

Hedge trimmers are well known tools for cutting hedges and, more generally, vegetation from plants. Typically, a hedge trimmer includes a motor forming part of a drive train arranged to drive the motion of one or more suitably shaped blades, thereby to cut vegetation. Typically two toothed blades are provided and they are driven in relative reciprocating motion such that stems or leaves caught between a pair of teeth on one of the blades are cut as the teeth blade shear with a pair of teeth on the other of the blades. Since it is the movement of the blades relative to each other that is important, in some cases, one axially reciprocating blade is provided disposed adjacent a stationary blade, the teeth of the stationary blade providing a reaction force for the teeth of the reciprocating blade. In another example, both blades are caused to move so as to generate the required relative motion.

The motor for driving movement of the blade(s) may itself be powered by any appropriate power source. In one example, the motor is arranged to receive power from a battery such as a Li ion battery provided within the tool housing. In another example an AC mains connection is provided to the tool which supplies power to drive the motor. In the case of the power source being a battery, clearly the available power to the motor will be more limited given the physical limitations on battery power that derive from size and weight and the fact that the tool (containing the battery) needs to be light enough so that it can be used.

Whilst having a powerful motor is desirable, the more powerful a motor is, the larger it will tend to be. Accordingly, since the motor is for use in a hand-held tool, in terms of weight and the ease with which the tool can be manipulated, it is clearly desirable to have as small a motor as possible.

Known systems for powering hedge trimmers are disclosed in, for example, GB-A-1,406,244, GB-A-1,427,077, GB-A-848,325 and GB-A-884,387. In GB-A-884,387 a clutch is provided in a tool (an example of which is a hedge trimmer). The clutch also functions as a flywheel to provide the benefit of stored kinetic energy. The clutch, and therefore the flywheel, is arranged within the tool housing and is thus exposed to the air within the cavity defined by the housing. In use, it will generate and experience windage as a consequence. Windage may be considered the force of the air acting on the flywheel due to the relative movement between them or, conversely, the wind generated by the flywheel as it rotates.

SUMMARY OF THE INVENTION

According to a first aspect of the present invention, there is provided a drive train for a hedge trimmer, the drive train being arranged in use, to provide power to a downstream mechanism, the drive train comprising: a motor having an output shaft; a pinion coupled to the output shaft; a reduction gear arranged to be driven by the pinion, the reduction gear contained within a gear housing; a flywheel coupled or coupleable to the output shaft, wherein the flywheel is arranged within the gear housing.

The invention provides a drive train for a hedge trimmer that includes a flywheel arranged within a gear casing. This has the effect of reducing windage whilst still providing the benefits of increased inertia from the flywheel. Thus, a smaller motor can be used without sacrificing inertia and without encountering the problem of windage. Furthermore, the presence of the flywheel within the gear housing means also that windage generated by the gears and the flywheel is minimised and thus has no deleterious effects on the drive train as a whole.

It will generally be understood that the presence of a flywheel enables the storage of energy which may be transferred, when required, to the blades of the hedge trimmer. The inertia of a flywheel is generally proportional to its radius squared ($r^2$). The energy stored by a flywheel is generally proportional to the inertia and the square of the angular velocity of the flywheel.

In one embodiment, the flywheel is selectively engageable and disengagable from the output shaft so as to selectively vary the inertia provided by the motor.

The invention, in this embodiment, provides a drive train for a hedge trimmer that includes a motor and an output shaft with a flywheel that is selectively engageable and disengagable from the output shaft so as to selectively vary the inertia provided by the motor. In other words, without disengaging the output shaft from the motor, and so as to continue to be able to derive power from the motor, the flywheel can be engaged or disengaged. This has the effect that the drive torque is decoupled from the inertia or kinetic energy provided by a motor.

The drive torque is the continuous torque required to drive the mechanism at the required speed. The inertia however is the stored energy required to be converted into cutting force at the blades. By providing a flywheel that is selectively engageable or disengageble from the output shaft of the motor, the kinetic energy delivered by the drive train can be varied.

Thus, the ability is provided by which a motor can simply be chosen to drive the blades at a "no-load" speed and the amount of inertia required to cut can be chosen independently of this. The heavier or larger the flywheel, the greater the inertia. Furthermore in some examples, the flywheel is selectively engageable or disengageable during use such that different power levels of cutting can be obtained from the same device.

This enables a smaller motor to be used, which is particularly advantageous in the case of use of a battery-powered motor. By providing a smaller motor, the rate of use of the power from the battery is reduced. Consequently, the required time between charges is increased.

In one example, the flywheel is arranged at the input side of a gear reduction. In other words, the output gear forms part of a gear reduction with the pinion. Since the flywheel is located at the input side of the gear reduction some significant advantage is provided in terms of stored energy. For example, and without any limitation, considering a flywheel weighing 76 g and having a diameter of, say 50 mm, at a typical motor speed of 24,000 rpm, about 80J of energy would be stored. In contrast, if the flywheel were provided at a typical gear-reduced output speed of, say, 1500 rpm, the stored energy would be about 0.3 J. Thus, by providing the flywheel at the input to the gear reduction, significantly improved energy storage is enabled. It will be appreciated that the actual values given here are merely exemplary, but demonstrate well the advantages of providing the flywheel at the input to a gear reduction.

In one embodiment, in use, the downstream mechanism can be driven irrespective of whether or not the flywheel is engaged. This provides the advantage that the motor can be used to drive a mechanism at two alternative power levels. In one case, the flywheel would be engaged and therefore the inertia, i.e. stored energy, would be relatively high. This would translate into an increased energy transfer from the blades and therefore greater cutting power.

In an alternative, the mechanism can be driven with the flywheel disengaged and thus be driven at relatively low power. Accordingly, the power required to drive the motor can be controlled correspondingly, which means that battery power will not be wasted when only low power output is required from the motor. This contrasts markedly with the device of for example, GB-A-884,387, in which with the clutch, i.e. the flywheel, disengaged, no power can be drawn from the motor to drive the associated tool.

In one embodiment, the flywheel is supported axially along its axis of rotation on both sides of the flywheel. This provides additional support and stability to the flywheel in use.

In one embodiment, the pinion and the flywheel are integrated as a single unitary component. The provision of an integrated flywheel/pinion component enables a simplified manufacturing process to be achieved. A single sintered component may be used, thus reducing part count and simplifying manufacture.

According to a second aspect of the present invention, there is provided a hedge trimmer, comprising a drive train according to the first aspect of the present invention.

Thus, a hedge trimmer is provided that has all the advantages described above with reference to the drive train.

In one embodiment, the hedge trimmer comprises: two blades arranged for relative reciprocating motion so as to enable the cutting of vegetation therebetween; and a drive train arranged to provide power to the blades and control motion of the blades relative to each other, wherein the drive train is a drive train according to the first aspect of the present invention.

Thus, a hedge trimmer is provided that has all the advantages described above with reference to the drive train.

In one embodiment, a hedge trimmer is provided including a drive train according to the first aspect of the present invention which includes the selectively engageable and disengageable flywheel. The tool also comprises an outer tool housing including one or more handles for a user to hold and activate the tool; and a flywheel actuator provided on the outer tool housing to enable a user to selectively engage or disengage the flywheel.

Thus, a simple and easy-to-use mechanism is provided by which a user can manually control the inertia of the hedge trimmer. The actuator may include one or more switches or levers.

In an alternative embodiment, instead of providing a manual actuator, an automatic sensor is provided which detects automatically the resistance to cutting and when some threshold level of resistance is detected, the flywheel is automatically engaged. Conversely, when the resistance drops below the threshold, the flywheel is automatically disengaged. An appropriate control circuit may be provided that will be within the knowledge of the skilled man.

Thus a user is able to use the hedge trimmer without concern as to the difficulty of cutting that might be encountered. Quite simply, if the resistance to cutting is such that the sensor detects the need for greater inertia, the flywheel is automatically engaged. Conversely, and so as to limit power consumption when possible, if the resistance then falls below the threshold, the flywheel is automatically disengaged.

According to a third aspect of the present invention, there is provided a method of enabling control of a hedge trimmer, the method comprising in a hedge trimmer, providing a drive train to provide power to a downstream mechanism, the drive train comprising: a motor having an output shaft; a pinion coupled to the output shaft; a reduction gear arranged to be driven by the pinion, the reduction gear contained within a gear housing; a flywheel coupled or coupleable to the output shaft, wherein the flywheel is arranged within the gear housing.

Thus, a method is provided that has all the advantages described above with reference to the drive train.

According to a further aspect of the present invention, there is provided a drive train for a hedge trimmer, the drive train being arranged in use, to provide power to a downstream mechanism, the drive train comprising: a motor having an output shaft; and a flywheel coupled or coupleable to the output shaft, wherein the flywheel is arranged within a flywheel housing that conforms closely to the shape of the flywheel. Preferably, the flywheel is substantially in the form of a disc having opposed major surfaces, wherein the clearance between the flywheel and the housing is less than 5 mm on both major surfaces of the flywheel. This provides the advantage of reduced windage generated or experienced by the flywheel.

BRIEF DESCRIPTION OF THE DRAWINGS

Embodiments of the present invention will now be described in detail with reference to the accompanying drawings, in which.

DETAILED DESCRIPTION OF THE INVENTION

Figure 1:
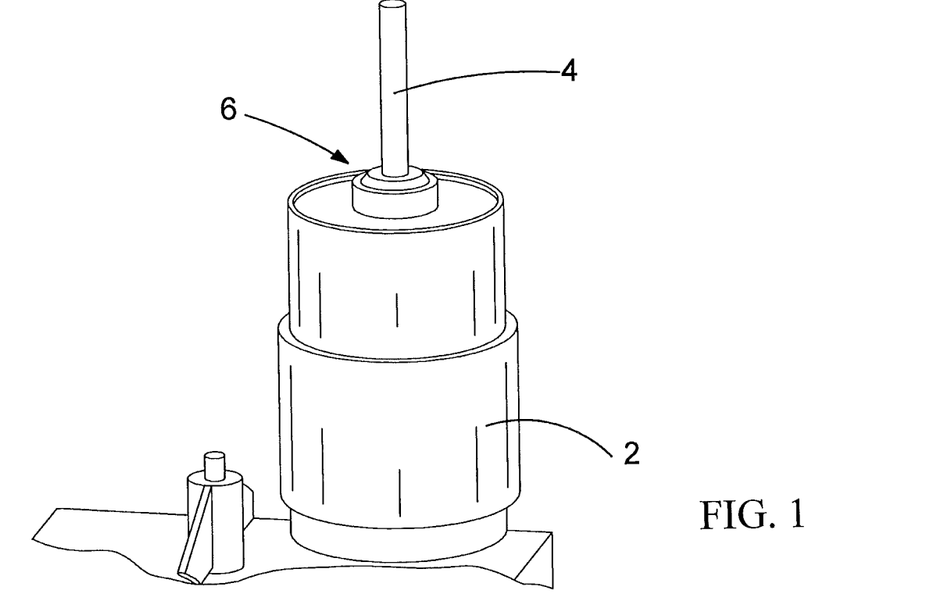
FIG. 1 shows an example of a motor from a drive train for a hedge trimmer.

Referring first to FIG. 1, and before describing the arrangement of the drive train in situ within a hedge trimmer, the components that would typically be included within a drive train according to an exemplary embodiment of the present invention will now be described.

FIG. 1 shows a motor 2 having an output shaft 4. In this example, the motor is a battery-powered motor that may run off a Li ion battery or other suitable type of battery. The shaft 4 is of a length so as to be able to support both a pinion and a flywheel, to be described in detail below. Shoulders 6 are provided which enable accurate positioning of the pinion and/or the flywheel on the shaft 4 to be achieved. In view of the requirement to support both a pinion and flywheel, the shaft 4 is extended somewhat as compared to the length that might be included were no flywheel included. In use the motor 2 would be arranged within the housing of a hedge trimmer. The flywheel is arranged within the gear casing (not shown) which serves to encase the pinion and the output gear. By providing the flywheel within this housing, the windage experienced or generated by the device is reduced.

Figure 2:
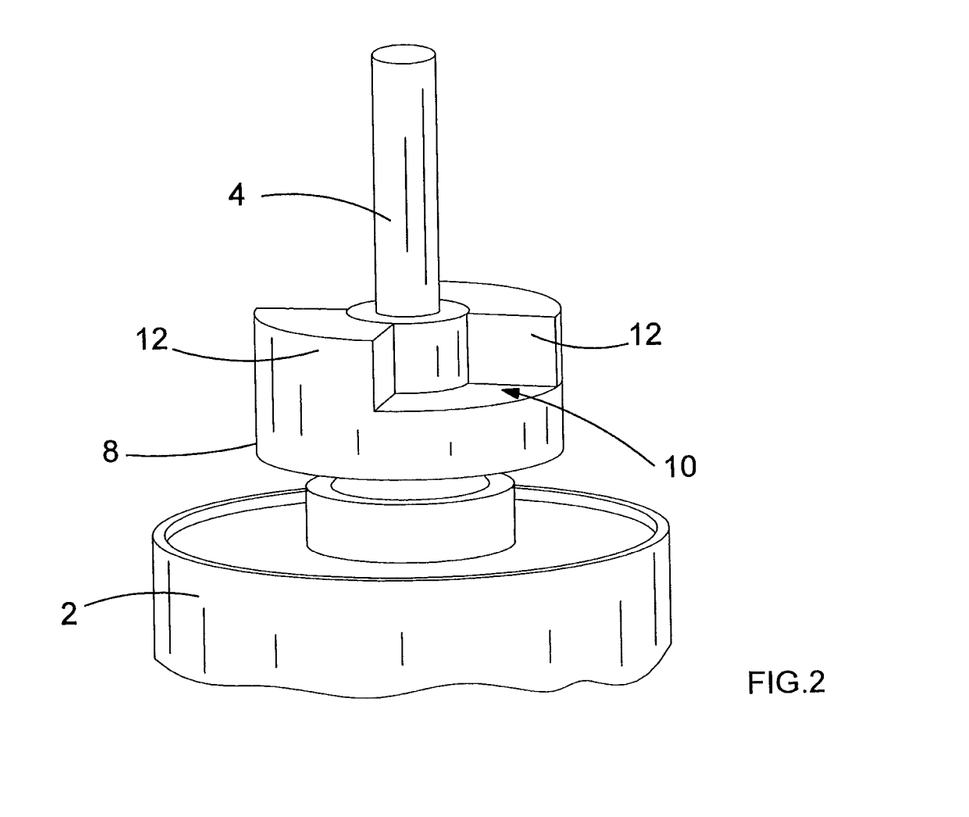
FIG. 2 shows the motor of FIG. 1 with an engagement wheel arranged thereon.

FIG. 2 shows the end of the motor 2 of FIG. 1 with an engagement wheel 8 arranged thereon. The engagement wheel has a shape and configuration that enables it to lock with another appropriately shaped component, to be described. In this example, the wheel 8 has diametrically opposed recessed sectors 10, and extended sectors 12 arranged therebetween. The recessed sectors 10 are shaped so as to be able to receive and lock rotationally with a component having similar recessed and extended sectors. The engagement wheel 8 is fixed rotationally with respect to the shaft 4. In other words, the engagement wheel 8 cannot rotate relative to the shaft 4. This can be achieved by keying the engagement wheel to the shaft or by any other suitable means.

Figure 3A:
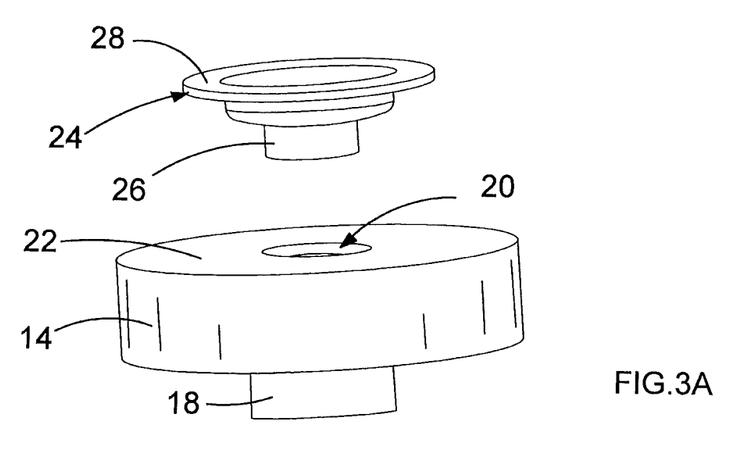
FIGS. 3A and 3B show, from opposed sides, views of a flywheel for use on the motor of FIG. 1.
Figure 3B:
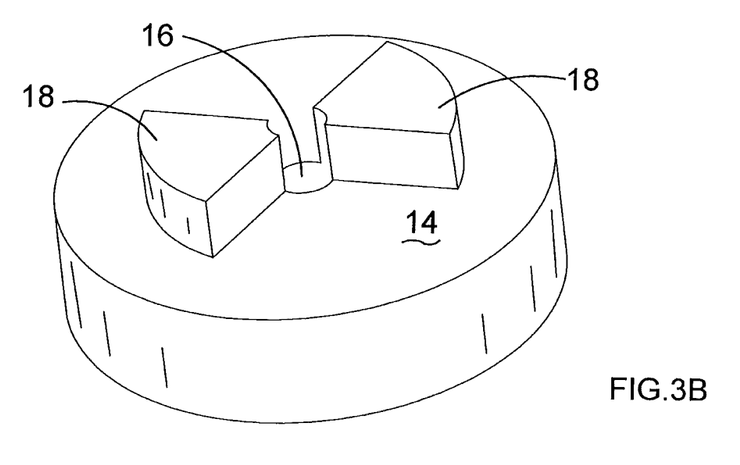

FIGS. 3A and 3B show, from opposed sides, views of a flywheel for use on the motor of FIGS. 1 and 2. The flywheel 14 has a cylindrical axial bore 16 arranged to fit on to the shaft 4 of the motor 2. Two extended sectors 18 are provided that are shaped correspondingly to the recessed sectors 10 of the engagement wheel 8. Thus, it will be appreciated that the flywheel 14 can be rotationally locked to the engagement wheel 8, by relative axial movement along the shaft 6. In an engaged position, the extended sectors 18 of the flywheel fit into the recessed sectors 10 of the engagement wheel 8, whilst the extended sectors 12 of the engagement wheel 8 fit into the recessed sectors defined between the extended sectors 18 of the flywheel. By controlling the relative axial position of the engagement wheel 8 and the flywheel 14, it can be determined whether or not the flywheel 14 is engaged with the output shaft 6.

A coupler 24 is provided, as shown in FIG. 3A, engaged with the rear side of the flywheel 14. The rear side 22 of the flywheel has an enlarged central axial opening 20 shaped to receive the coupler 24. The coupler 24 has an extended cylindrical extension 26 arranged to fit tightly within the opening 20 on the rear side 22 of the flywheel and connect thereto. The connection between the coupler 24 and the flywheel must be secure such that movement of the flywheel can be controlled by control of the coupler 24. This can be achieved by use of one or more of welding, adhesive, press fit or any other appropriate means of coupling. Indeed, in one example, the coupler and the flywheel are formed and/or provided as an integrated component. This is particularly advantageous as it leads to a reduced parts count and can be formed conveniently by a sintering or molding process.

Figure 4:
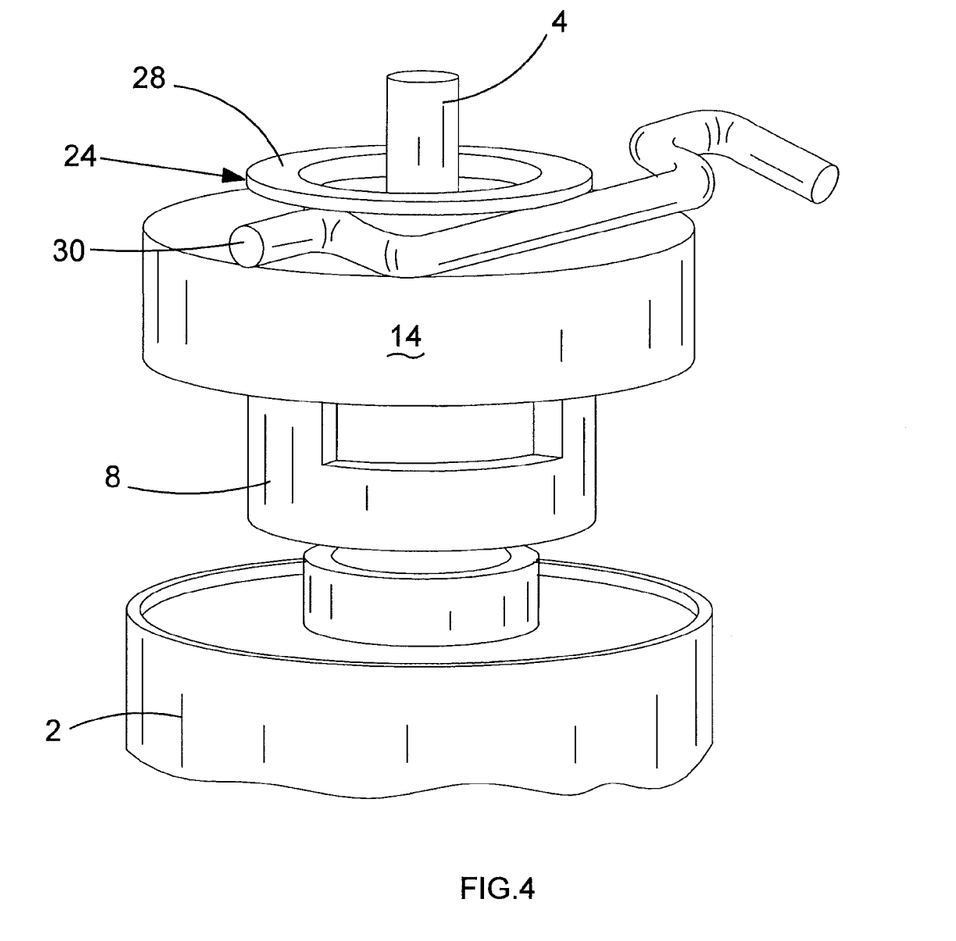
FIGS. 4 and 5 show a motor with a flywheel engaged and disengaged, respectively.

As can be seen, the coupler 24 has an extended annular rim 28. FIG. 4 shows a schematic representation of the drive train in which the flywheel 14 is engaged with the engagement wheel 8. The extended and recessed annular sectors of the flywheel and the engagement wheel 8 are engaged such that the flywheel is rotationally fixed to the engagement wheel 8. Accordingly, since the engagement wheel is rotatably fixed to the output shaft, the flywheel is also rotatably fixed to the output shaft of the motor. A pinion 36 (not shown in FIG. 4 or 5, but seen clearly in, say FIGS. 7A and 8) is typically provided on the output shaft 6 for engagement with a gear 38 for driving movement of a downstream mechanism such as the blades of a hedge trimmer. A clutch is also preferably provided within the drive train, e.g. to enable rotational movement of the motor to be coupled to the down stream mechanism, as will be understood by a skilled person.

Figure 5:
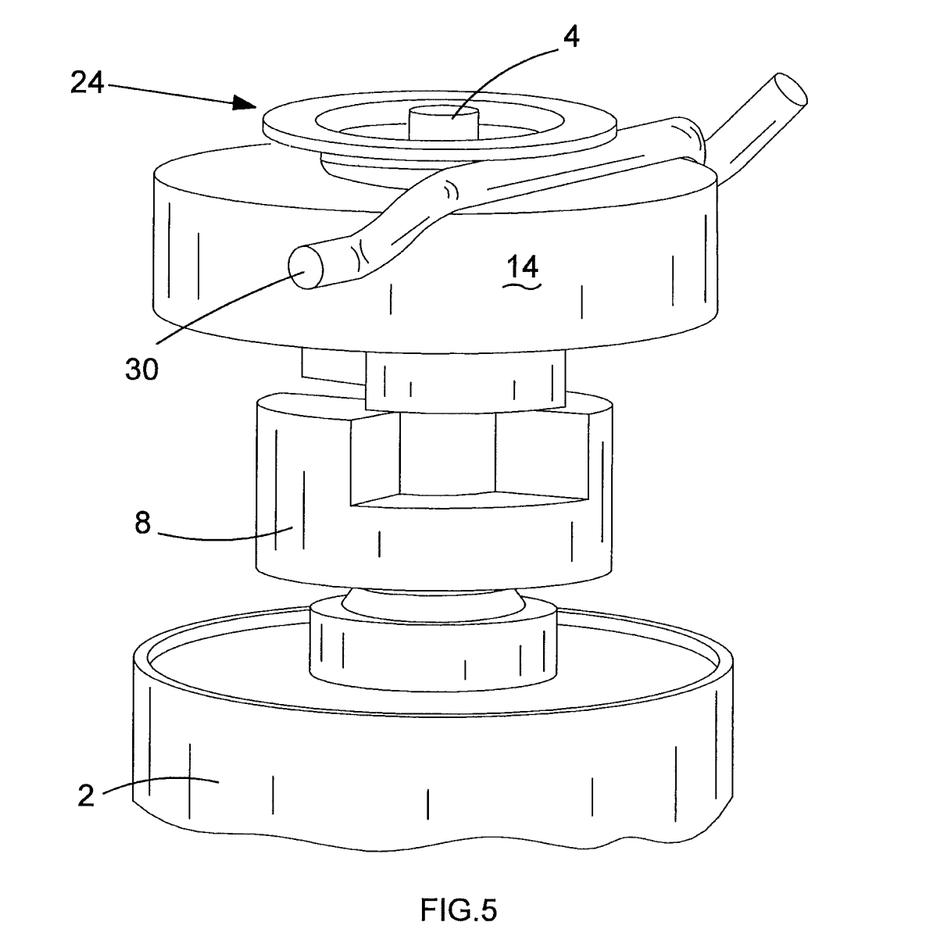

In this example, a control arm 30 is provided that is sized and arranged to fit in the gap between the extended annular rim 28 of the coupler 24 and the rear side 22 of the flywheel 14. By control of the position of the control arm 30, the flywheel 14 can be made to move axially along the shaft 4 thus moving it between an engaged position as shown in FIG. 4 and a disengaged position as shown in FIG. 5. Thus, a user is able to selectively control the flywheel either to be engaged or disengaged from the output shaft 4 of the motor 2. It will be appreciated that other forms of coupler may be used so long as it enables connection between the control arm 30 and the flywheel.

By doing this a user is able to control the inertia of the device and thus the energy which may be imparted to the downstream mechanism, i.e. the blades of a hedge trimmer. Accordingly, the motor could be run with low inertia when cutting one type of material and then have the flywheel engaged so as to increase the inertia and be able to cut a different harder-to-cut type of material. The same motor is used at all times and this means that a smaller motor can be used which can then have its inertia selectively increased by engagement of the flywheel with its output shaft.

Preferably, in the unengaged position the flywheel is free to rotate relative to the output shaft.

Conventionally, if a high inertia cutting device was required, a correspondingly sized large motor would be required. Using the present system, a low power and inertia motor can be used for most cutting, but, when difficult to cut material is to be cut, the inertia can be selectively increased. When running at low inertia, less battery power will be consumed as compared to when running at high inertia, i.e. if the motor were larger, as in a conventional hedge trimmer. In a battery-powered device, this is particularly advantageous since it means that a relatively small motor can be used, requiring a correspondingly smaller and therefore lighter battery, which is nevertheless able to deliver high inertia when required. The system will thus benefit from the low power consumption that goes with a small motor most of the time and need only increase power consumption when required to cut harder-to-cut material.

The control arm 30 will typically be connected to a control device (not shown) on the external housing of the tool. Thus, a user can easily and conveniently switch to the required inertia level. Furthermore, by providing the flywheel within a housing, windage is reduced, thereby increasing efficiency.

It will be appreciated that in the example described above, the flywheel is selectively engageable or disengageable from the output shaft of the motor. However, in some examples, the flywheel is fixedly engaged with the output shaft. The advantage of providing a significantly increased inertia from a smaller motor is still obtained and the benefits of arranging the flywheel within the gear housing or its own dedicated housing ensures that the problem of windage is addressed, as explained above.

The materials for forming the engagement wheel 8 and the flywheel 14 can be selected from any appropriate materials which will be well known to a skilled man. In one example, the engagement wheel is a sintered component formed on the output shaft 4 of the motor 2.

Figure 6:
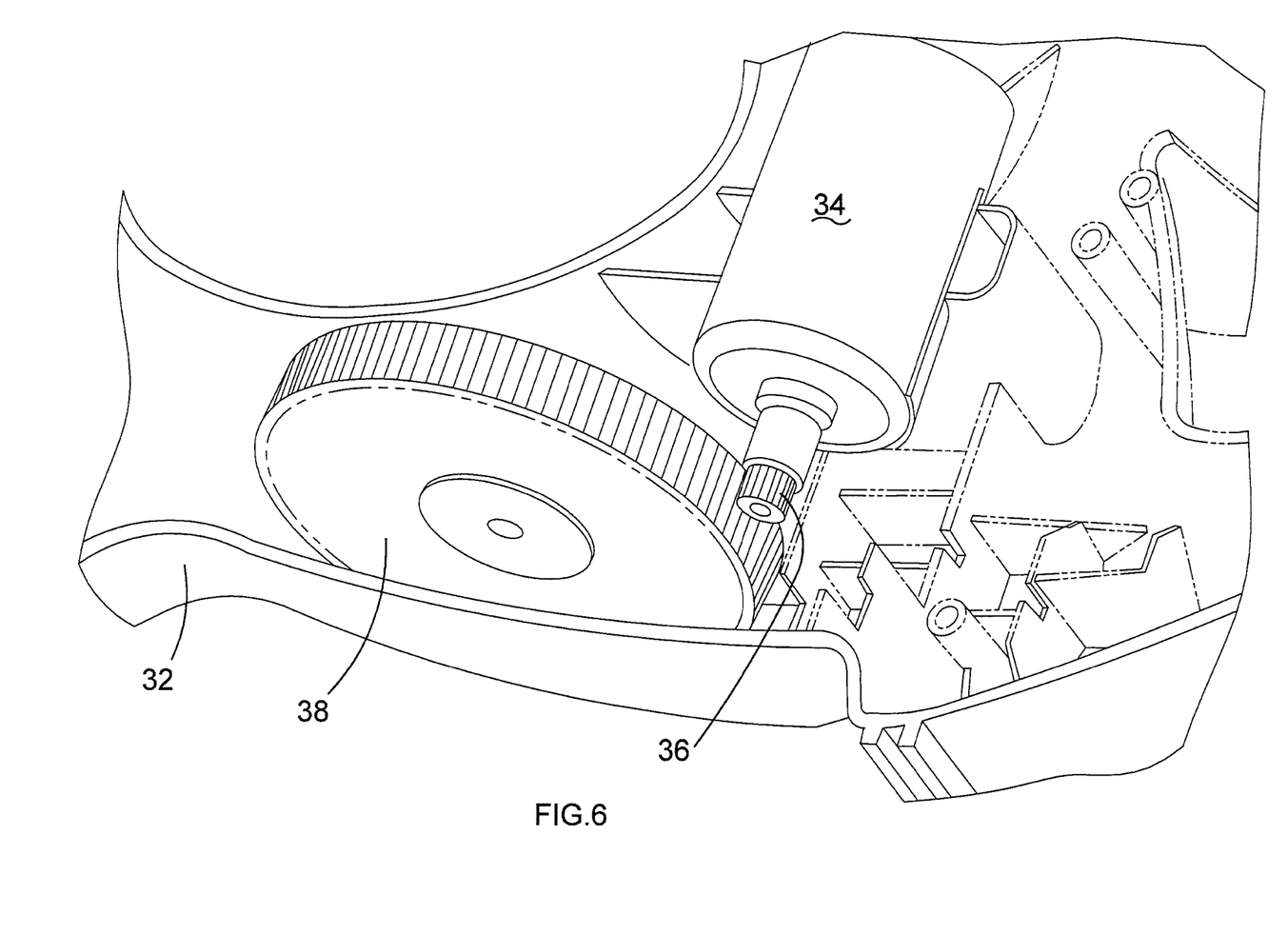
FIG. 6 shows a schematic representation of the housing and internal components of a hedge trimmer.

Referring now to FIG. 6, the internal components of a hedge trimmer are shown. The hedge trimmer comprises an external or outer tool housing 32 within which are arranged a motor 34 having an output shaft with a pinion 36 arranged thereon. A reduction gear 38 is provided, which is arranged to drive, preferably via a clutch mechanism (not shown), the relative movement of the blades (also not shown). The pinion gear has a length that enables a significant area of overlap with the reduction gear 38 so as to enable a press fit between the two. The inertia of the reduction gear is relatively small due to its relatively slow angular velocity as compared to that of the driving pinion directly coupled to the motor output shaft.

As explained above, in the case of a cordless motor such as a Li ion battery-powered motor, if sufficient inertia is to be provided so that energy can be transferred to the cutting blades to enable hard-to-cut vegetation to be cut, then a powerful and correspondingly large motor (and appropriate battery) would be required. Given the effect that the use of such a motor would have on battery life and weight of the tool overall, this is not desirable.

Figure 7A:
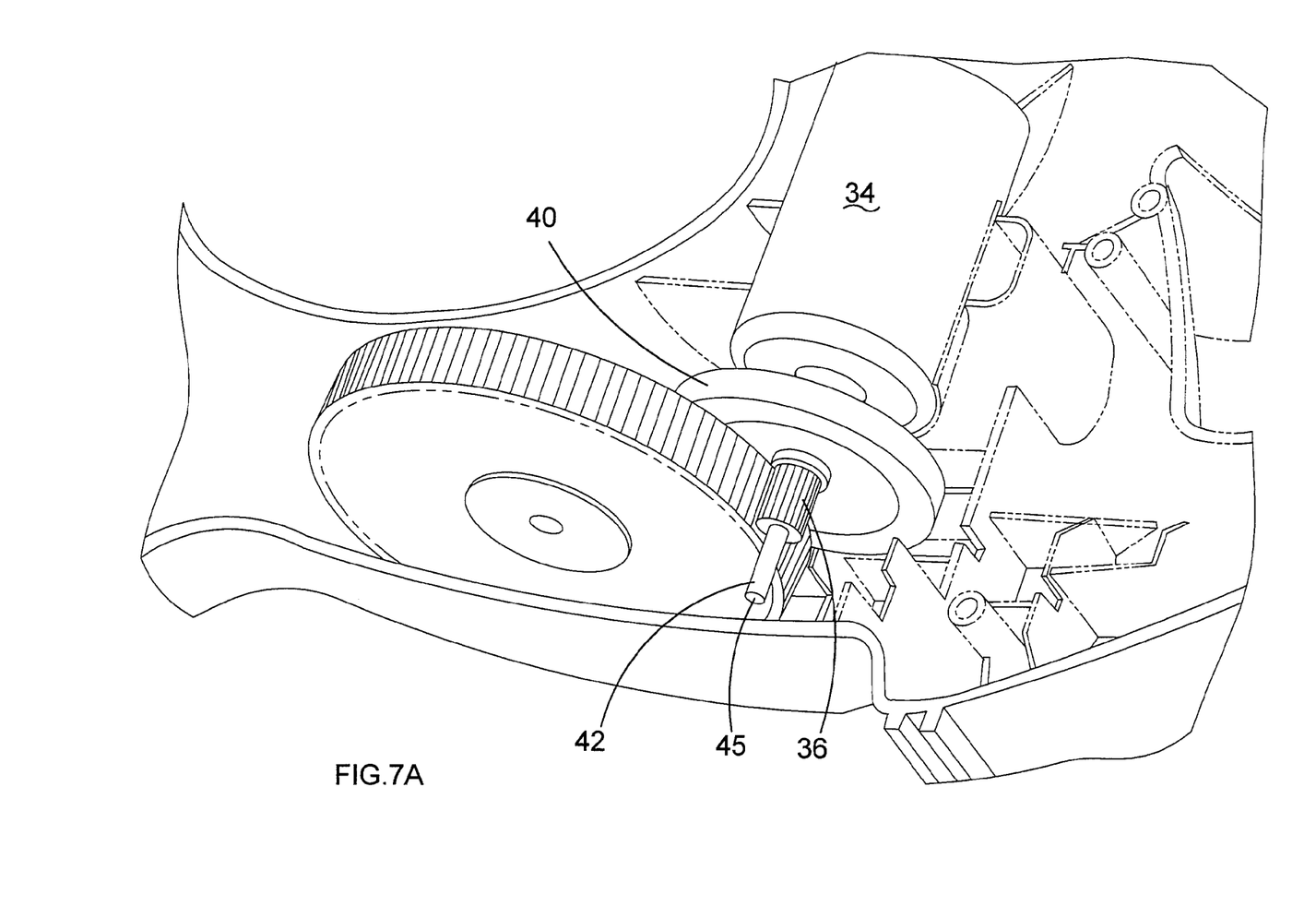
FIG. 7A shows a schematic representation of the drive train within a hedge trimmer.

FIG. 7A shows a schematic representation of the internal components of a hedge trimmer similar to that of FIG. 6. However, in this case, a flywheel 40 is provided coupled to the output shaft 42 of the motor 34. In the example shown in FIG. 7A, the flywheel is fixedly mounted to the output shaft. However, as explained above with reference to FIGS. 4 and 5, in one example, the flywheel is selectively engagable or disengagable from the output shaft. In the case that the flywheel is selectively engagable or disengagable from the output shaft, preferably an actuator is provided on the outer tool housing, which enables a user to manually control the position and state of engagement of the flywheel. The actuator may be a switch or lever configured to control the position of the arm 30, as shown in FIGS. 4 and 5.

In one embodiment, a sensor is provided which detects the resistance to cutting and when some threshold level of resistance is detected, the flywheel is automatically engaged. Conversely, when the resistance drops below the threshold, the flywheel is automatically disengaged. An appropriate control circuit may be provided that will be within the knowledge of the skilled man.

A housing (not shown) is provided to encase the gears or, at the very least, the flywheel 40, so as to minimise windage that will occur due to the fast rotation of the flywheel. It will be appreciated that since the flywheel, when engaged, is rotating at the same rate as the output shaft of the motor, significant windage could be experienced or generated. This is avoided by providing the flywheel within the gear housing or within its own dedicated housing. The end 45 of the output shaft 42 is preferably supported within a boss (not shown) or some other such fitting provided on an inner surface of the housing of the tool. This provides additional stability to the output shaft and the flywheel in use.

Figure 7B:
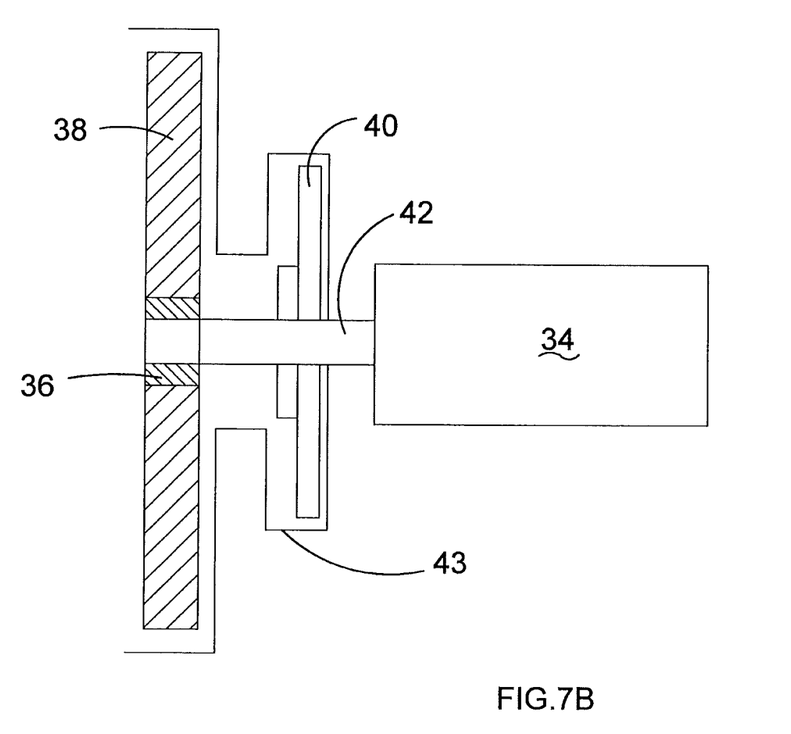
FIG. 7B shows a simplified schematic representation of a section through part of the drive train of a hedge trimmer.

FIG. 7B shows schematically a longitudinal section through a part of the power train shown in FIG. 7A. The motor 34 has output shaft 42 having arranged thereon a flywheel 40. A housing 43 is arranged to surround the flywheel 40, pinion 36 and reduction gear 38, and thereby reduce windage generated thereby. In one example, a dedicated housing to surround the flywheel may be provided. The housing is formed to conform closely to the dimensions of the flywheel (in both positions if it is disengageable as described above) whilst ensuring sufficient clearance so as not to hinder movement of the flywheel or risk collision therewith.

Figure 8:
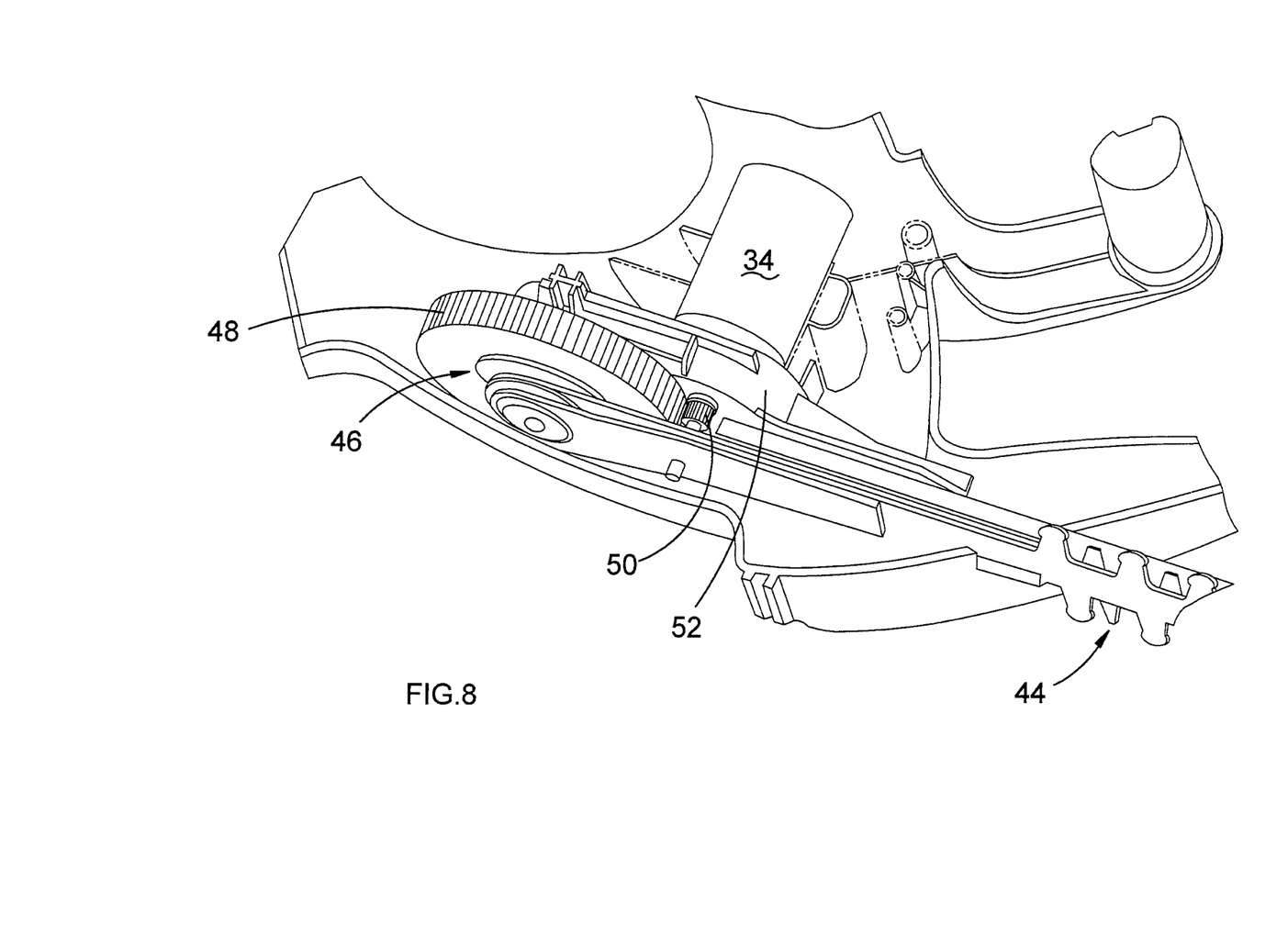
FIG. 8 shows a schematic representation of the drive train within a hedge trimmer.

Referring to FIG. 8, the blades 44 of the hedge trimmer can be seen. A transmission 46 is provided between the gear 48 and the pinion 50. A housing 52 is provided around the flywheel such that the windage generated or experienced is minimised or entirely avoided. The housing conforms closely to the dimensions of the flywheel as explained above. Typically, the flywheel may be substantially in the form of a disc having opposed major surfaces, wherein the clearance between each of the major surfaces of the flywheel and the housing is less than 5 mm. Preferably, the clearance would be between 1 and 5 mm. This also enables a relatively small flywheel housing to be provided.

Thus, a drive train for a hedge trimmer is provided in which an output or reduction gear 38 and a pinion are provided within a gear housing, together with a flywheel coupled or couplable to the output shaft of a motor. The flywheel is arranged within a housing which may be the same as the gear housing or a separate, dedicated flywheel housing. In both cases, windage is reduced, thereby increasing efficiency of the device whilst providing the benefits of the flywheel described above. This is particularly advantageous in the case of a battery-powered motor since a smaller motor can be powered whilst not sacrificing power of the device overall.

Embodiments of the present invention have been described with particular reference to the examples illustrated. However, it will be appreciated that variations and modifications may be made to the examples described within the scope of the present invention as defined by the appended claims.

The invention claimed is:

1. A hedge trimmer having a drive train, the drive train being arranged in use, to provide power to a downstream mechanism of the hedge trimmer, the drive train comprising:
   a motor having an output shaft;
   a pinion coupled to the output shaft;
   a single reduction gear arranged to be driven by the pinion;
   a flywheel that is engaged with the output shaft, wherein the reduction gear and flywheel are arranged within a gear housing;
   wherein the flywheel is selectively engageable and disengageable from the output shaft by axially moving the flywheel, and the flywheel's position does not affect the means by which power is delivered from the motor to the downstream mechanism.

2. The hedge trimmer according to claim 1, further comprising an engagement wheel fixed to said output shaft and the flywheel capable of coupling with the engagement wheel.

3. The hedge trimmer according to claim 2, wherein the engagement wheel including recessed sectors that are adapted to couple with extended sectors on the flywheel.

4. The hedge trimmer according to claim 3, further comprising a coupler attached to the flywheel, the coupler having an annular rim that is spaced from the flywheel and forming a groove; and
   a control arm positioned in the groove for controlling the engagement or disengagement of the flywheel to the engagement wheel.

5. The hedge trimmer according to claim 4, in which the flywheel is supported axially along its axis of rotation on both sides of the flywheel.

6. The hedge trimmer according to claim 5, in which the pinion and the flywheel are a unitary component.

7. A hedge trimmer having a drive train for powering cutting blades, the drive train comprising:
   a motor having an output shaft;
   the output shaft delivering power to the cutting blades;
   a flywheel that is engageable and disengagable from the output shaft by axially moving the flywheel, so as to selectively vary the energy provided by the motor with the output shaft; and
   wherein the status of the flywheel does not affect the delivery of power from the motor to the cutting blades.

8. The hedge trimmer according to claim 7, in which the cutting blades comprises two blades arranged for relative reciprocating motion so as to enable the cutting of vegetation therebetween.

9. The hedge trimmer according to claim 8, further comprising an engagement wheel fixed to said output shaft and the flywheel capable of coupling with the engagement wheel.

10. The drive train according to claim 9, wherein the engagement wheel includes recessed sectors that couple with extended sectors on the flywheel.

11. The hedge trimmer according to claim 9, further comprising a coupler attached to the flywheel for moving the flywheel into and out of engagement with the engagement wheel.

12. The hedge trimmer according to claim 7 further comprising an outer tool housing including one or more handles for a user to hold and activate the hedge trimmer; and a flywheel actuator provided on the outer tool housing to enable a user to selectively engage or disengage the flywheel.

13. The hedge trimmer according to claim 12, wherein the drive train further includes a pinion coupled to the output shaft and a reduction gear arranged to be driven by the pinion.

* * * * *